United States Patent
Bauduin et al.

(10) Patent No.: US 10,450,714 B2
(45) Date of Patent: Oct. 22, 2019

(54) DEVICE FOR PROTECTING AGAINST THE SCOURING OF GRANULAR FILLINGS SUBMERGED IN GRAVITY STRUCTURES

(71) Applicants: DRACE INFRAESTRUCTURAS, S.A., Madrid (ES); DRAGADOS, S.A., Madrid (ES); SA BESIX NV, Brussels (BE)

(72) Inventors: Christophe Bauduin, Bruselas (BE); Miguel Vazquez Romero, Madrid (ES); Noelia Gonzalez Patiño, Madrid (ES); Elena Martin Diaz, Madrid (ES); Jaime Remon Higuera, Madrid (ES)

(73) Assignees: DRAGADOS, S.A., Madrid (ES); SA BESIX NV, Brussels (BE); DRACE INFRAESTRUCTURAS, S.A., Madrid (ES)

( * ) Notice: Subject to any disclaimer, the term of this patent is extended or adjusted under 35 U.S.C. 154(b) by 0 days.

(21) Appl. No.: 16/091,028

(22) PCT Filed: Apr. 7, 2016

(86) PCT No.: PCT/ES2016/070236
§ 371 (c)(1),
(2) Date: Oct. 3, 2018

(87) PCT Pub. No.: WO2017/174834
PCT Pub. Date: Oct. 12, 2017

(65) Prior Publication Data
US 2019/0071839 A1    Mar. 7, 2019

(51) Int. Cl.
*E02D 31/00*  (2006.01)
*E02B 17/02*  (2006.01)
(Continued)

(52) U.S. Cl.
CPC .............. *E02D 31/00* (2013.01); *E02B 17/02* (2013.01); *E02D 23/02* (2013.01); *E02D 27/42* (2013.01);
(Continued)

(58) Field of Classification Search
CPC combination set(s) only.
See application file for complete search history.

(56) References Cited

U.S. PATENT DOCUMENTS

| 4,576,519 A | 3/1986 | Mast et al. |
| 4,701,075 A | 10/1987 | Martyshenko |

(Continued)

FOREIGN PATENT DOCUMENTS

| WO | WO 2014060650 A2 | 4/2014 |  |
| WO | WO-2016016481 A1 * | 2/2016 | ............. E02B 17/02 |
| WO | WO 2016016481 A1 | 2/2016 |  |

*Primary Examiner* — Kyle Armstrong
(74) *Attorney, Agent, or Firm* — Aslan Law, P.C.

(57) ABSTRACT

A device for protecting against the scouring of granular fillings submerged in gravity structures in which a filling with granular materials must be deposited once the structures are submerged, so that the structures reach a weight sufficient to en sure the stability thereof against the actions to which they are subjected. The device consists of one or more porous covers that sit and/or are secured as an upper closure of the structure to protect the inner filling, each of the covers having a plurality of openings that are distributed on the surface thereof and have a size suitable to allow the passage of the filling material, which filling material is transferred to the inside of the structure simply by pouring until a height close to the cover is reached, leaving a margin or chamber between the two that is suitable for generating an internal turbulence that dissipates wave energy and incident currents, thereby making it difficult for the filling material to escape from the inside through the openings.

25 Claims, 2 Drawing Sheets

(51) Int. Cl.
*E02D 23/02* (2006.01)
*E02D 27/42* (2006.01)
*F03D 13/25* (2016.01)

(52) U.S. Cl.
CPC ........... *E02D 27/425* (2013.01); *F03D 13/25* (2016.05); *E02D 2200/165* (2013.01); *E02D 2200/1607* (2013.01); *E02D 2300/002* (2013.01); *E02D 2300/0006* (2013.01); *E02D 2300/0026* (2013.01)

(56) References Cited

U.S. PATENT DOCUMENTS

| | | | | |
|---|---|---|---|---|
| 4,717,286 | A * | 1/1988 | Loer | E02B 3/12 405/15 |
| 2009/0158680 | A1* | 6/2009 | Jolly | E02D 27/42 52/292 |
| 2010/0183377 | A1* | 7/2010 | Fraenkel | E02D 27/52 405/232 |
| 2011/0091287 | A1* | 4/2011 | Polo | E02D 27/42 405/204 |
| 2012/0128436 | A1* | 5/2012 | Harris | E02D 27/42 405/302.6 |
| 2015/0136670 | A1* | 5/2015 | Ramslie | E02B 17/02 210/170.11 |
| 2015/0225918 | A1* | 8/2015 | Phuly | E02D 27/42 52/297 |

\* cited by examiner

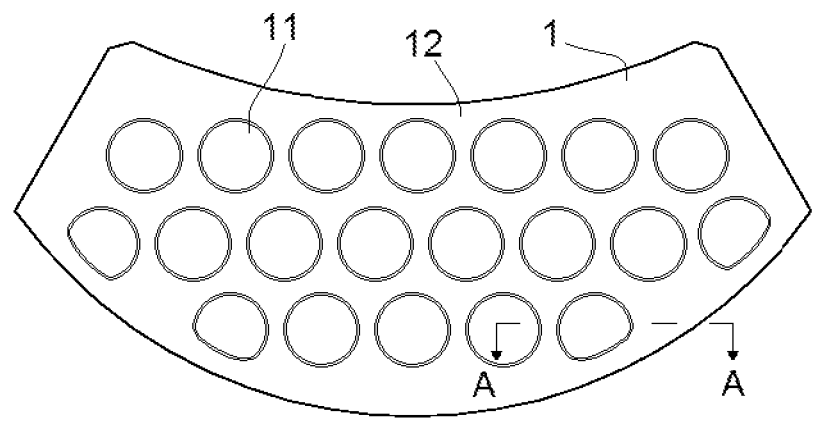
Fig. 1
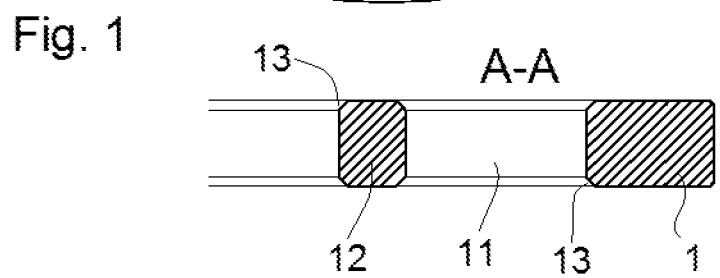
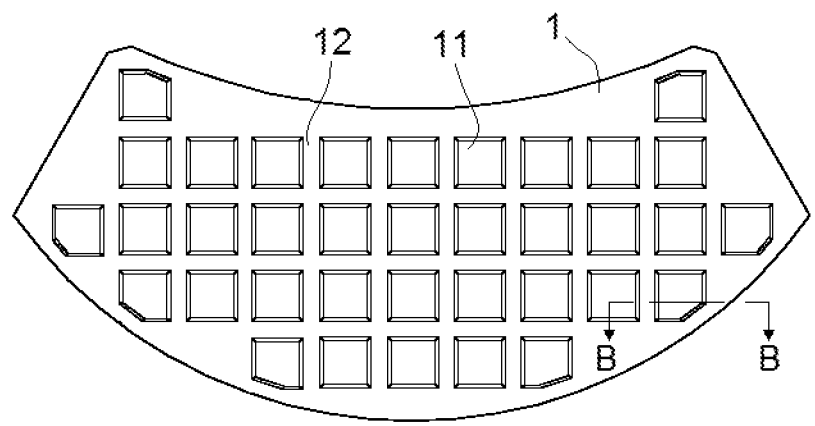
Fig. 2
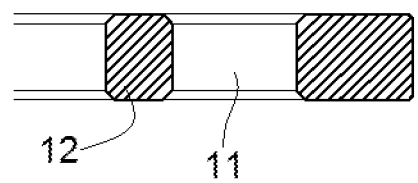

DEVICE FOR PROTECTING AGAINST THE SCOURING OF GRANULAR FILLINGS SUBMERGED IN GRAVITY STRUCTURES

OBJECT OF THE INVENTION

The present invention, as indicated by the title, relates to a closing device for gravity structures, preferably foundations for offshore wind turbines, the purpose of which is protection against the scouring of the submerged granular filling placed therein, based on a set of porous covers, conveniently fixed and placed with respect to the existing filling in the structure that is stabilised, submerged and supported in the river or seabed.

BACKGROUND OF THE INVENTION

Numerous gravity-type marine or river structures, i.e. they require their own sufficient weight to ensure the stability thereof against the actions to which they are subjected, achieve said stabilising weight by means of filling with granular materials, usually sand. This filling can be performed by mechanical means (pouring or placing with land or marine equipment) or by hydraulic means (by means of pumping a mixture of water and sand). However, once the filling of said structures has been completed and since this is an essential element for guaranteeing the functional nature of the structure, it is necessary to protect this filling from external actions that can cause this material to be lost. In structures wherein this filling stays enclosed by the very structure, this risk does not exist. However, some structures by their very design must remain completely or partially open, the filling being exposed to a greater or lesser degree to the actions of external agents. In the latter case and for marine structures, these agents are waves and currents. Meanwhile, in river structures the main agent is the current. In both cases, these agents can cause the filling material to be lost by means of the progressive scouring and transportation towards the outside.

Normally, if the structures have an emerged portion, the protection of this filling against these agents is simple, the use of diverse elements for the protection thereof being common: breakwaters, concrete blocks, bags of sand or concrete, gabions, in situ concrete slabs or even slabs that enclose the material by forming completely closed structures. When they are submerged gravity structures, the use of the same elements for protecting the filling as in emerged structures can be applied. However, the installation thereof may be more difficult to execute. Furthermore, in the case of progressive loss of filling material, the replacement thereof as well as the repair of these elements can be complex and expensive.

Another main constraint for these submerged structures is the difficulty of performing the filling. To do so and once the structure is supported on the bottom in the final location thereof, the structure must have one or several inlets to enable the introduction of filling material from the outside. Although the systems for executing said filling of the structure are the same as those described previously (mechanical or hydraulic) in many cases, by being submerged structures, there are difficulties in accessing by land means, the use of marine means usually being necessary. Likewise, it is common to use hydraulic methods for performing said filling, by using dredges that pump the fluid (mixture of water and sand) into the element. However, a contradiction is then produced between the constructive complexity (which requires openings that are large enough to introduce the filling inside the structure) and the capacity of the structure itself to provide protection for the filling on the inside.

DESCRIPTION OF THE INVENTION

The protection system presented herein tries to solve the aforementioned problem; to do so, a permeable cover has been designed that enables it to be installed in the upper portion of the gravity structure, preferably during the manufacture thereof, although it could be possible be to install it in situ on the very structure once it is anchored in the sea (or river) bed. This porous cover provides sufficient protection for the inner filling against the action of waves and currents, sufficient to ensure the stability of the inner filling during the useful life of the structure and, therefore, the necessary stabilising weight.

The following features thereof are notable:

Drastic reduction in weight with respect to a traditional slab, which can be very beneficial if the installation of the gravity structure is performed by taking advantage of the flotation thereof.

It favours the passage of the filling material through the openings arranged therein, with which the marine means to be used are simplified.

It makes the passage of the water possible, reducing the effect of suction/pressure by the passage of the wave on the structure. This enables the cover to be structurally optimised, since it reduces the stresses that it will be subjected to during the useful life thereof.

As mentioned, it can be executed "in situ" on the very structure (filling container) or be manufactured beforehand and subsequently installed.

It does not have durability limitations different than the rest of the container.

It does not require larger-sized rocks for protection or filtering layers. In fact, the protection of the filling does not depend on the weight of the breakwater-type protection elements, the protection being able to be proposed with much smaller stone sizes, which enable it to be implemented much more quickly and with means that are much simpler and cheaper It enables the sized openings to be designed according to the size of the granular material to be used. The larger the opening, the greater the energy from the waves and the currents that accesses the inside and, therefore, the greater the erosion that can be produced in the inner filling of the container. However, on the other hand, it facilitates the laying of the inner filling through the openings. It is therefore convenient to reach a balance between the size of the openings and that of the filling material and upper protection. In order to choose the size of the opening, the larger sizes of the inner filling material and the corresponding filter layer thereof must be taken into account. Generally, the ratio of the larger size of the filtering units (stones) to the main dimension of the openings are in the range of $½$ to $⅕$, based on the severity of the waves and the currents that it must handle.

It acts as protection for elements that require fillings made of granular material in order to reach stability, especially those that require being anchored and are thus sensitive to the weight thereof when installed.

These covers as covering elements are made up of a lattice of beams made of reinforced concrete, post-tensioned concrete, metals, GFRP or another resistant material according to the application, with a structure able to support the stress created by the filling. Said structure has openings, distributed along and throughout the surface thereof, that on one hand make the structure lighter and on the other enable the passage of the material to the inside. Once installed in the application site thereof, the container is filled by simple pouring (by direct pouring, by means of scooping, pipes or another alternative method) with granular material, until the height provided for that purpose. Said material stays immediately contained and protected, without needing subsequent stabilisation work.

In the service phase, the cover enables the passage of the fluid, preventing the action of the waves and the currents from integrally resisting due to the structure, creating a turbulent flow through the openings. In order to cause a greater loss due to turbulence, a margin is left between the porous covers and the filter material (typically between 0.50 and 1.00 m) as a "turbulence chamber or cushion". Said turbulent flow dissipates a very significant portion of the energy, preventing the mobilisation of the material on the inside; furthermore, the material that is mobilised will not be able to leave the confinement area, due to the difficulty of a vertical escape route being produced for the material, through the cover.

Additionally, the openings of the covers have a small chamfer with the object of improving the hydrodynamic behaviour, reducing stresses due to the waves and currents, and preventing the presence of edges that could be damaged during the filling process.

This solution has been tested in a physical model, the aforementioned advantages being able to be seen, as well as the degree of protection and stability that the inner filling material reaches when faced with the action of these external agents. Thus, as mentioned, the need for a traditional breakwater-type protection layer is prevented, and the protection conditions with filtering-type materials are greatly reduced.

DESCRIPTION OF THE FIGURES

As a complement to the description provided herein, and for the purpose of helping to make the characteristics of the invention more readily understandable, this specification is accompanied by a set of drawings which, by way of illustration and not limitation, represent the following.

FIGS. 1 and 2 show plan views and a detailed cross-section of corresponding covers (1) wherein the shape, number and arrangement of the openings (11) change for lightening and for the filling of the structure (3) to be closed.

PREFERRED EMBODIMENT OF THE INVENTION

Figure 3:
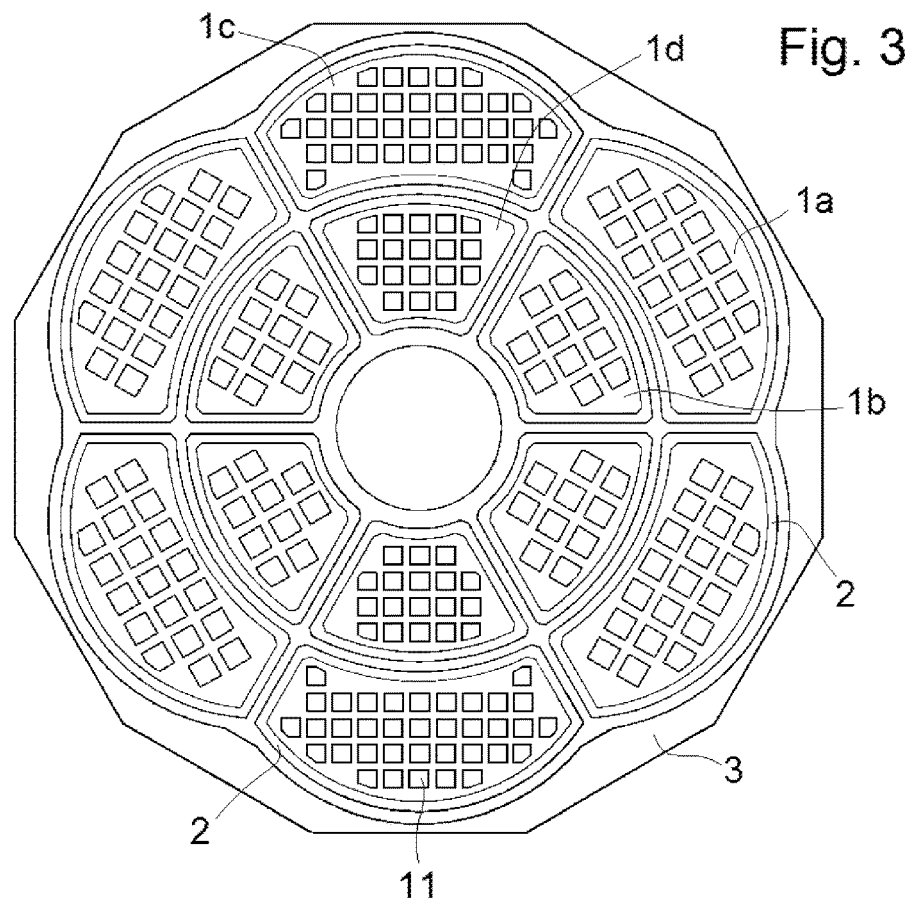
FIGS. 3 and 4 show a corresponding plan view and a cross-section view down the middle of a foundation of GBS (Gravity Base Structures), once closed with several porous covers, with different configurations and sizes of hole openings and with the filling (4) up to the final level; as well as a detail © of the connection of these covers (1) with the rest of the structure (3).

As seen in the figures, the device for protecting against the scouring of submerged granular fillings in gravity structures (3), which require the placement of a filling (4) with granular materials, once submerged, so that they reach their own sufficient weight that ensures the stability thereof against the actions to which they are subjected, that adapts in the shapes and dimensions thereof to the configuration of the structure to be covered.

The device in question consists of at least one or several porous covers (1) that sit and/or are secured as an upper closure of the structure (3), before or after said structure is installed in the submerged location thereof, providing protection for the inner filling (4). According to a fundamental characteristic of the invention, these covers (1) have a plurality of openings (11) distributed along and throughout the surface thereof, which have a suitable size for allowing the passage of the filling material (4), which is transferred to the inside of the structure (3) by simple pouring until reaching a height close to the cover (1), such that there is a margin or chamber (5) between the two, wherein an inner turbulence is created that dissipates the energy of the incident waves and currents, hindering the output of the filling material from the inside (4) through the openings (11).

The openings (11) of the cover or covers (1) can have any configuration; generally, they will be circular (FIG. 1) or polygonal (FIG. 2) or mixed solutions, based on the geometry of the element to be protected and in any case will have dimensions comprised between 0.30 and 2.0 m; in a preferred embodiment the diameter of the openings (1) is comprised between 0.40 and 1.20 m and in general the size thereof will be fixed based on the size of the filling material to be protected, the ratio of the larger size of the units of the filling (4) and the main dimension of the openings (11) being between ½ and ⅕, based on the severity of the waves and the currents that it must handle.

In FIG. 3 several models of covers (1a, 1b, 1c, 1d) are shown based on the shape of the hole existing in the structure (3) to be covered and the number, arrangement and shape of the openings (11) existing therein.

As shown in the figures, the openings (11) of the cover or covers (1) have a chamfer (13) in the edges, which have the object of improving the hydrodynamic behaviour, by reducing stresses due to waves and currents, and preventing the presence of edges that could be damaged during the filling process.

In a preferred embodiment, the cover or covers (1) are manufactured from reinforced or post-tensioned concrete and are made up of a lattice of beams (12) that make up a structure able to support the stress created by the filling. Nevertheless, these covers (1) can also be metal or be manufactured from glass-reinforced plastic (GFRP).

Figure 4:
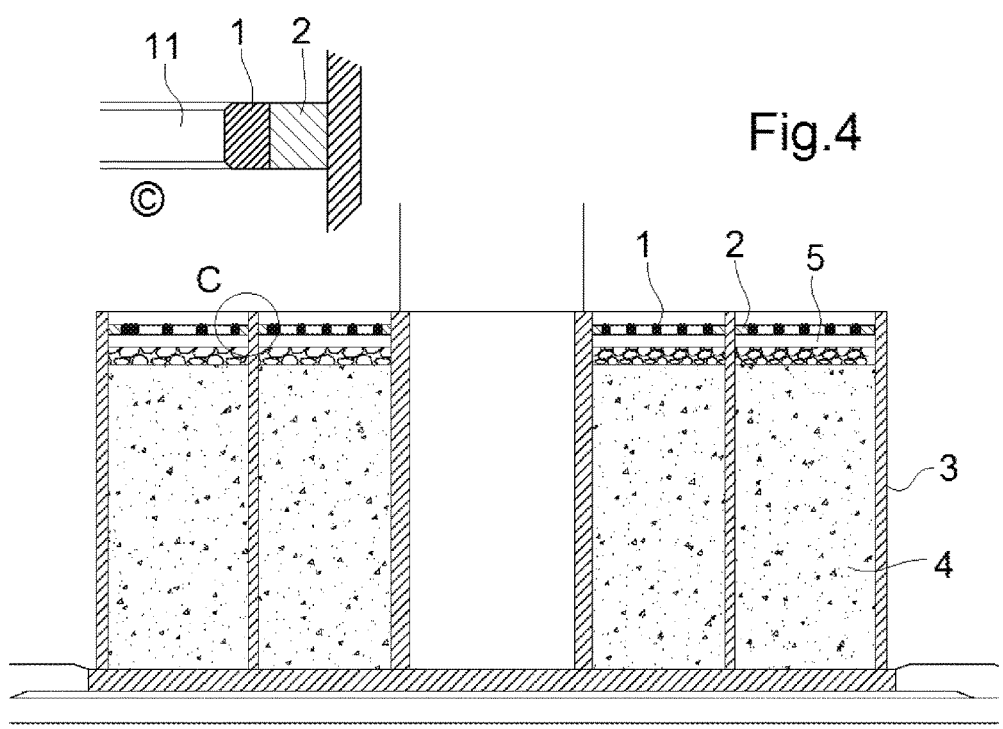

In the detail © marked in FIG. 4, a perimeter connection (2) that connects the cover or covers (1) to the rest of the structure (3) is shown. Particularly when the covers (1) are manufactured from concrete, this joint will be made of the same material, placed after the cover (1) in the final location thereof on the structure (3).

Tests were performed on a physical model and it was concluded that the margin or chamber (5) that is remain between the cover or covers (1) and the filling material (4) must be comprised between 0.20 and 1.30 m, preferably between 0.50 and 1.00 m, so that turbulence is created that is able to dissipate the energy of the incident waves and currents, hindering the output of the filling material from the inside through the openings (11).

With this type of covers (1) the need for breakwaters or other types of protections for the inner filling (4) is prevented, only requiring a filter-type material placed on top that meets a certain ratio between the maximum size and the main dimension of the opening.

This device is an ideal solution to be applied to those structures (3) that are installed by means of towing and anchoring, taking advantage of the flotation capacity thereof, since the weight of the porous covers is limited and does not hinder the buoyancy of the of the structure. The modularity of the design of the covers suitable for positioning in a structure enables them to be manufactured separately therefrom and placed in position before or after the anchoring.

Having sufficiently described the nature of the invention, in addition to an example of preferred embodiment, it is hereby stated for the relevant purposes that the materials, shape, size and layout of the described elements may be modified, provided that it does not imply altering the essential characteristics of the invention claimed below:

The invention claimed is:

1. A device for protecting against the scouring of granular fillings submerged in gravity structures in which an inner filling material with granular materials must be deposited once the gravity structures are submerged, so that the gravity structures reach a weight sufficient to ensure the stability thereof against the actions to which they are subjected, the device comprising:
at least one porous cover or covers that sits and/or is secured as an upper closure of the structure, before or after said structure is installed in the submerged location thereof, protecting the inner filling material, that has a plurality of openings that are distributed along and throughout the surface thereof, which have a suitable size for allowing passage of the inner filling material, which the inner filling material is transferred to the inside of the structure simply by pouring until a height close to the at least one porous cover or covers is reached, leaving a margin or chamber or a gap between the at least one porous cover or covers and the inner filling material that is suitable for generating an internal turbulence that dissipates wave energy and incident currents.

2. The device according to claim 1, wherein the openings of the at least one porous cover or covers have a circular, polygonal or mixed configuration and have a diameter comprised between 0.30 and 2.0 m.

3. The device according to claim 1, wherein the openings of the at least one porous cover or covers have a chamfer on the edges.

4. The device according to claim 3, wherein the at least one porous cover or covers are made up of a lattice of beams, which make up a structure able to support the stress created by the inner filling material.

5. The device according to claim 4, wherein the at least one porous cover or covers are manufactured from reinforced or post-tensioned concrete.

6. The device according to claim 2, wherein the openings of the at least one porous cover or covers have a chamfer on the edges.

7. The device according to claim 6, wherein the at least one porous cover or covers are made up of a lattice of beams, which make up a structure able to support the stress created by the inner filling material.

8. The device according to claim 7, wherein the at least one porous cover or covers are manufactured from reinforced or post-tensioned concrete.

9. The device according to claim 6, wherein the at least one porous cover or covers are manufactured from reinforced or post-tensioned concrete.

10. The device according to claim 2, wherein the at least one porous cover or covers are made up of a lattice of beams, which make up a structure able to support the stress created by the inner filling material.

11. The device according to claim 10, wherein the at least one porous cover or covers are manufactured from reinforced or post-tensioned concrete.

12. The device according to claim 1, wherein the at least one porous cover or covers are made up of a lattice of beams, which make up a structure able to support the stress created by the inner filling material.

13. The device according to claim 12, wherein the at least one porous cover or covers are manufactured from reinforced or post-tensioned concrete.

14. The device according to claim 1, wherein the at least one porous cover or covers are manufactured from reinforced or post-tensioned concrete.

15. The device according to claim 1, wherein the at least one porous cover or covers are metal.

16. The device according to claim 1, wherein the at least one porous cover or covers are manufactured from glass-reinforced plastic (GFRP).

17. The device according to claim 1, wherein the at least one porous cover or covers are fastened to the rest of the structure by means of a perimeter connection.

18. The device according to claim 1, wherein the margin or chamber or a gap that must be between the at least one porous cover or covers and the inner filling material is comprised between 0.20 and 1.30 m.

19. The device according to claim 1, wherein the openings of the at least one porous cover or covers have a circular, polygonal or mixed configuration and have a diameter comprised between 0.40 and 1.20 m.

20. The device according to claim 1, wherein the margin or chamber or a gap that must be between the at least one porous cover or covers and the inner filling material is comprised between 0.50 and 1.00 m.

21. The device according to claim 1, wherein cells are the chambers where said device is compartmentalized to be filled with said granular filling.

22. The device according to claim 21, wherein a first porous cover of said at least one porous cover or covers is used to cover a first cell of said cells and a second porous cover of said at least one porous cover or covers is used to cover a second cell of said cells.

23. The device according to claim 21, wherein said at least one porous cover or covers are placed over the top of the walls of the cells of said device and said at least one porous cover or covers are connected to said device without a structural connection therebetween.

24. The device according to claim 1, wherein the connection between said device and said at least one porous cover or covers is structurally rigid.

25. The device according to claim 1, wherein the at least one porous cover or covers are made up of units, which make up a structure able to support the stress created by the inner filling material, and wherein said units include holes which form a grid.

* * * * *